United States Patent [19]
Arjunan et al.

[11] Patent Number: 5,942,587
[45] Date of Patent: Aug. 24, 1999

[54] ETHYLENE POLYMERS WITH A NORBORNENE COMONOMER FOR LLDPE LIKE RESINS OF IMPROVED TOUGHNESS AND PROCESSIBILITY FOR FILM PRODUCTION

[75] Inventors: Palanisamy Arjunan; Bruce A. Harrington, both of Houston; Eric J. Markel, Kingwood; Scott K. Jackson, Baytown, all of Tex.

[73] Assignee: Exxon Chemical Patents Inc., Houston, Tex.

[21] Appl. No.: 08/976,163

[22] Filed: Nov. 21, 1997

[51] Int. Cl.$^6$ .................................. C08F 232/08
[52] U.S. Cl. ........................ 526/281; 526/308; 526/348; 526/348.3; 526/348.4; 526/348.5; 526/348.6; 526/943
[58] Field of Search ................ 526/281, 348.6, 526/943, 308, 348.3, 348.4, 348.5

[56] References Cited

U.S. PATENT DOCUMENTS

| | | |
|---|---|---|
| 2,934,527 | 4/1960 | McKay et al. . |
| 5,055,438 | 10/1991 | Canich . |
| 5,087,677 | 2/1992 | Brekner et al. . |
| 5,168,111 | 12/1992 | Canich . |
| 5,225,503 | 7/1993 | Sagane et al. . |
| 5,272,235 | 12/1993 | Wakatsuru et al. . |
| 5,324,801 | 6/1994 | Brekner et al. . |
| 5,359,001 | 10/1994 | Epple et al. . |
| 5,552,504 | 9/1996 | Bennett et al. . |
| 5,629,398 | 5/1997 | Okamoto et al. . |
| 5,635,573 | 6/1997 | Harrington et al. . |

FOREIGN PATENT DOCUMENTS

| | | |
|---|---|---|
| 2115196 | 2/1994 | Canada . |
| 0 504 418 A1 | 9/1992 | European Pat. Off. . |
| 0501 370 A1 | 9/1992 | European Pat. Off. . |

*Primary Examiner*—Fred Zitomer
*Attorney, Agent, or Firm*—W. G. Muller

[57] ABSTRACT

An ethylene cyclic olefin polymer, particularly an ethylene/norbornene copolymer and an ethylene/norbornene/alpha olefin terpolymer resin, of improved toughness and processibility for film production. This invention provides ethylene based resins which are processible like an LLDPE but which are significantly improved with respect to their capability to be fabricated into a film layer, particularly by a blown bubble extrusion technique. Films prepared of the resins of this invention are significantly improved with respect to certain of their film properties, such as tear strength, without detracting from the beneficial properties that an LLDPE-like resin otherwise provides to a film. Molding application of the above E/NB copolymers and E/NB/O terpolymers is also disclosed.

38 Claims, 1 Drawing Sheet

ETHYLENE POLYMERS WITH A NORBORNENE COMONOMER FOR LLDPE LIKE RESINS OF IMPROVED TOUGHNESS AND PROCESSIBILITY FOR FILM PRODUCTION

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

Polyolefins and other polymer types are typically fabricated into films by either of two general film forming techniques. Molten polymer may be extrusion cast through a slot die to form a film layer, and films so formed are generally referred to as cast films. Or, molten polymer may be extruded through an annular die to form a gas tight extrudate enclosure which is then filled with blown air to expand the extrudate into an air supported film bubble, and films so formed are generally referred to as blown bubble films.

The technique of forming polymer resins into films by a blown bubble extrusion technique is widely practiced and presents various processing simplifications and conveniences compared to that of film formation by slot die extrusion casting techniques. However, to successfully practice film formation by a blown bubble extrusion technique, the polymer resin of which the film layer is to be formed must possess certain minimum physical/mechanical properties, chief of which is a strength at its extrusion temperature (i.e., "melt strength") sufficient to support formation of a film bubble during its blowing and expansion by air.

Heretofore certain types of polymer resins that otherwise possess physical/mechanical/chemical properties that are desirable in a film for various end uses, have presented melt strength properties that render such resins problematic for production into films by a blown bubble extrusion technique. One such type of problematic polymer resin is that of linear low density polyethylenes. A linear low density polyethylene, conventionally referred to as LLDPE, is a copolymer of ethylene with a minor quantity of an olefinic hydrocarbon comonomer, typically an acyclic $C_3$–$C_8$ alpha-olefin, such that ethylene comprises at least about 80 wt. % of the polymer whereas the acyclic alpha-olefin comonomer content comprises less than about 20 wt. % of the polymer mass. Copolymerization of ethylene with such minor quantities of acyclic olefinic hydrocarbon comonomer introduces short chain branching along the polymer backbone to yield a thermoplastic ethylene based polymer having a density in the range of about 0.910 to about 0.940 $g/cm^3$, with lower densities associated to higher comonomer contents and higher densities associated to lower comonomer contents. A LLDPE thus possesses many mechanical/chemical property attributes that are similar to a highly branched low density homopolyethylene (a LDPE) produced by high pressure free radical polymerization, while a LLDPE also possesses certain mechanical/chemical and Theological properties like that of an unbranched or linear high density homopolyethylene (HDPE) produced by low pressure Ziegler-Natta polymerization processes. Hence, this type of high ethylene content thermoplastic ethylene-alpha-olefin copolymer is referred to as a linear low density polyethylene; namely, LLDPE.

LLDPEs are employed as such, or as a component in blend with yet other polymers, for the formation of films which are designed for a variety of applications, such as: films for the consumer market such as household disposable, trash bags and liners; overvrap films and bags for laundry and dry cleaning goods; and shipping and carry out bags for retail merchandising. LLDPE is desirable as a resin for films of such end use designs because of its relatively low cost compared to other resin types such as polyvinylchloride, etc. It also possesses in combination with this low cost an excellent set of mechanical/physical/chemical properties such as tensile strength, secant modulus, tensile tear strength, puncture resistance, elongation at break, etc.

To this end, LLDPE resins have heretofore been extruded into film layers by both film forming techniques—slot die casting and blown bubble extrusion techniques. However, due to the relatively low melt strength and relatively low melt viscosity under low shear rates of an LLDPE resin compared to other polymer types, an LLDPE is more difficult to use as such for fabrication into a film layer by the blown bubble extrusion technique. Hence, when a LLDPE resin as such is used in a blow bubble extrusion technique for film formation, the processing conditions must be more carefully controlled within a narrower window of operating conditions and certain limitations must be observed upon the dimensions to which the film layer of a LLDPE can be produced, particularly that of its film thickness. Such limitations that must be observed with an LLDPE as utilized in a blown bubble extrusion technique for film formation further limit the rate of film production compared to that at which other types of polymer could be produced to film by a blown bubble extrusion technique.

BRIEF SUMMARY OF THE INVENTION

This invention provides resins of a high ethylene (E) content ($\geq 77$ wt. %) and a comonomer content wherein a cyclic olefin, preferably norbornene (NB), is incorporated to at least the extent of 0.1 mole % which are significantly improved with respect to their capability to be fabricated into a film layer, particularly by a blown bubble extrusion technique. The high ethylene content polymers of this invention are substantially linear polymers in that the polymer backbone contains substantially only short chain branches, and in this regard the ethylene polymers of this invention are similar to the heretofore known linear polyethylenes (LPE); the ethylene polymers of this invention have many properties like a LLDPE while having densities that may be greater than that of a LLDPE as typically prepared with acyclic alpha-olefins as the comonomer.

The ethylene polymers of this invention may be an ethylene/cyclic olefm copolymer or an ethylene/cyclic olefin/acyclic alpha-olefin terpolymer. The cyclic olefin may be any cyclo-olefin which includes cyclized ethylenic or acetylenic unsaturation that in the presence of a metallocene catalyst will insert into a polymer chain without ring opening such that the ring structure in which the unsaturation is present is incorporated into the polymer backbone. Examples of suitable cyclic olefins are described in U.S. Pat. No. 5,635,573, the disclosure of which is hereby incorporated by reference. Preferred as the cyclic olefin are the norbornenes which include norbornene and $C_{1-30}$ alkyl substituted norbornene, cyclopentenes, and tetracyclododecene. Of these, norbornenes are most preferred.

The ethylene polymers of this invention may be an ethylene/cyclic olefin copolymer, such as an ethylene/norbornene copolymer (E/INB), or an ethylene/cyclic olefin/acyclic alpha-olefin terpolymer, such as an ethylene/norbornene/acyclic alphaolefin interpolymer (E/NB/O). The most preferred thermoplastic ethylene polymers of this invention comprises an ethylene/norbornene copolymer (E/NB) having a norbornene content of 0.1–8 mole %. The norbornene comonomer may be norbornene as such or $C_{1-30}$ alkyl substituted norbornene having the alkyl substituent at the 5 or 7 position, preferably at the 5 position. Of the substituted norbornenes the $C_{1-20}$ alkyls are preferred and the $C_{1-10}$ alkyls are most preferred. Hereafter this class of copolymer is generally referred to as an E/NB copolymer although when an alkyl substituted norbornene is employed the copolymer may be referred to as an E/NB-R copolymer wherein R denotes the alkyl substituent.

In accordance with this invention, the E/NB copolymer is prepared by polymerizing ethylene with norbornene or an alkyl substituted norbornene using a supported metallocene catalyst in a batch or continuous two-phase polymerization process such as a gas phase process or slurry process to produce an ethylene norbornene copolymer or terpolymer having a weight average molecular weight ($M_w$) of 20,000 to 300,000 or greater; a molecular weight distribution ($M_w/M_n$) of 2 to 5; a melt index (MI) of 0.1 to 100 dg/min as determined according the ASTM Test Method D 1238, Condition 190/2.16; and a broad distribution of said norbornene comonomer (NB or NB-R) across the various molecular weight fractions that comprise the ethylene/norbornene copolymer resin, as indicated by a comonomer distribution breath index (CDBI) value of or less than 60%. The ethylene/norbornene copolymer (E/NB and/or E/NB-R) exhibits by DSC a melting transition in the region of 60 to 135° C. with a peak melting point temperature in the 120 to 135° C. region for norbornene comonomer contents ranging from 0.1 to about 8 mole %. The ethylene/norbornene copolymers (E/NB copolymers) exhibit many of the physical/mechanical properties of conventional LLDPE's while also exhibiting a shear thinning behavior so as to behave in their melt as a fluid-like material. Such ethylene norbornene resins behave like LLDPE resins but are expected to have significantly improved processability and toughness characteristics for the production of film layers, particularly for the production of film layers by a blown bubble extrusion technique, and thereby overcome the processability/toughness deficiencies inherent in prior LLDPE resins for film production. Further, it has been found that films prepared of the E/NB type LLDPE resins of this invention are significantly improved with respect to certain of their film properties, such as tear strength, without detracting from the beneficial properties that a LLDPE type of resin otherwise provides to a film.

Accordingly, the subject matter of this invention is the E/NB type LLDPE resin and films produced therefrom wherein at least one film layer thereof is comprised of the E/NB type LLDPE resin.

It has further been found that the E/NB polymer may be prepared as a terpolymer wherein ethylene, a norbornene and a $C_3$–$C_8$ acyclic alpha-olefin are copolymerized to yield an LLDPE type of resin. In this case, on a mole basis, the quantity of norbornene or alkyl substituted norbornene incorporated is at least 0.1 mole % but less than 10 mole %, preferably less than 7 mole % and more preferably between 0.1 and 5 mole %, while the quantity of acyclic alpha-olefin incorporated is at least about 0.1 mole % without exceeding about 10 mole %, preferably without exceeding about 7 mole %. Hereafter this class of terpolymers will generally be referred to as E/NB/O terpolymers regardless of whether the norbornene comonomer is or is not alkyl substituted. Such E/NB/O terpolymer types of LLDPE resins are generally of a density of at least about 0.910 g/cm³ ranging up to about 0.940 g/cm³ and are further improved with respect to their processability and toughness characteristics for production of films. Films prepared of such E/NB/O terpolymer resins exhibit a further enhancement with respect to tear strengths of films produced therefrom. Accordingly, the subject of this invention is E/NB/O terpolymer types of LLDPE resins and films produced therefrom having at least one film layer comprised of such E/NB/O terpolymer resin.

DETAILED DESCRIPTION OF THE PREFERRED EMBODIMENTS

Figure 1:
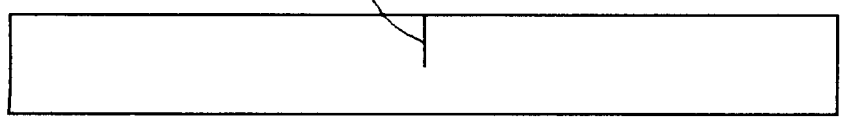
FIG. 1 illustrates the sample configurations used for tear tests of films described by the Examples hereof.
Figure 1:
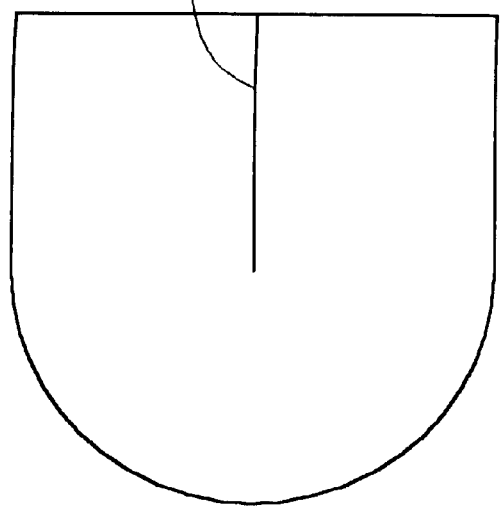

This invention comprises in its broadest aspects metallocene produced ethylene polymers wherein a cyclic olefin is present as a comonomer in an amount of or less than 10 mole % of the total monomer content of the polymer and wherein the polymer has a molecular weight distribution of or less than 5 and a composition distribution breadth index (CDBI) of or less than 60%. The ethylene polymer may be a copolymer of the cyclic olefin or a terpolymer of the cyclic olefin and an acyclic alpha-olefin.

Norbomene is a preferred cyclic olefin for production of these ethylene polymers as also are alkyl substituted norbornenes such as 5-methylnorbornene-2, 5-ethylnorbornene-2, 5-hexylnorbornene-2 and the like.

This invention comprises an E/NB and E/NB/O type LLDPE resin that is readily processible and of sufficient toughness for efficient production into a film layer by a blown bubble extrusion technique. The ethylene/lnorbornene (E/NB) copolymer has a content of norbornene which is less than 10 mole % and, preferably of 0.1 to 8 mole % NB whereas the E/NB/O terpolymer has a content of norbornene of less than 10 mole % and preferably of 0.1 to 5 mole %.

Production of an ethylene copolymer or ethylene terpolymer having a norbornene (NB and/or NB-R) content that is broadly distributed across the different molecular weight fractions that comprise the resin has been found to provide the resin with non-linear elongation characteristics. This provides the E/NB and E/NB/O type LLDPE resin with properties of melt strength and elasticity that permits for fast processing by blown bubble extrusion techniques to a film bubble of excellent bubble stability which is susceptible to fast drawdowns. Further, films formed of the E/NB and the E/NB/O type LLDPE exhibit markedly superior tear resistance properties—both with respect to unnotched and to notched resistance to tear propagation—compared to a comparable film formed of a conventional LLDPE.

Catalyst for polymerization of the E/NB and E/NB/O resins here preferred are comprised of a transition metal component having at least one ligand (L) which is a single or fused ring hydrocarbyl radical which contains or comprises a cyclopentadienyl anion moiety through which the ligand coordinatively bonds to the transition metal cation. Such catalyst systems are now commonly referred to as "metallocene" (m) catalysts and many examples of such metallocene catalyst systems have now been described in the art.

Metallocene catalysts, for example, are typically those bulky ligand transition metal complexes derivable from the formula:

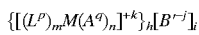

where L is a bulky ligand bonded to M, p is the anionic charge of L and m is the number of L ligands and m is 1, 2 or 3; A is a ligand bonded to M and capable of inserting an olefin between the M-A bond, q is the anionic charge of A and n is the number of A ligands and n is 1, 2, 3 or 4; M is a metal, preferably a transition metal, and (p×m)+(q×n)+k corresponds to the formal oxidation state of the metal center where k is the charge on the cation and k is 1, 2, 3 or 4; B' is a chemically stable, non-nucleophilic anionic complex, preferably having a molecular diameter of 4 Å or greater and j is the anionic charge on B', h is the number of cations of charge k, and i the number of anions of charge j such that h×k=j×i.

Any two L and/or A ligands may be bridged to each other. The catalyst compound may be full-sandwich compounds having two or more ligands L, which may be cyclopentadienyl ligands or substituted cyclopentadienyl ligands, or half-sandwich compounds having one ligand L, which is a cyclopentadienyl ligand or heteroatom substituted cyclopentadienyl ligand or hydrocarbyl substituted cyclopentadienyl ligand such as an indenyl ligand, a benzindenyl ligand or a fluorenyl ligand and the like or any other ligand capable of $\eta^5$ bonding to a transition metal atom (M). One or more of these bulky ligands is π-bonded to the transition metal atom. Each L can be substituted with a combination of substituents, which can be the same or different including hydrogen or a linear, branched or cyclic alkyl, alkenyl or aryl radicals for example. The metal atom (M) may be a Group 4, 5 or 6 transition metal or a metal from the lanthanide and actinide series. Preferably the transition metal is a Group 4 metal particularly, titanium, zirconium and hafnium in any formal oxidation state, preferably, +4. Other ligands may be bonded to the transition metal, such as a leaving group, such as but not limited to weak bases such as amines, phosphines, ether and the like. In addition to the transition metal, these ligands may be optionally bonded to A or L.

In one embodiment, the metallocene catalyst system utilized in this invention is formed from a catalyst compound represented by the general formula:

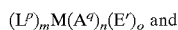

an aluminum alkyl, alumoxane, modified alumoxane or any other oxy-containing organometallic compound or non-coordinating ionic activators, or a combination thereof Where L, M, A and p, m, q and n are as defined above and E is an anionic leaving group such as but not limited to hydrocarbyl, hydrogen, halide or any other anionic ligand; r is the anionic charge of E and o is the number of E ligands and o is 1, 2, 3 or 4 such that (p×m)+(q×n)+(r×o) is equal to the formal oxidation state of the metal center. Non-limiting examples of metallocene catalyst components and metallocene catalyst systems are discussed in, for example, U.S. Pat. Nos. 4,530,914; 4,805,561; 4,937,299; 5,124,418; 5,017,714; 5,057,475; 5,064,802; 5,198,401 5,278,264; 5,278,119; 5,304,614; 5,324,800; 5,347,025; 5,350,723; 5,391,790 and 5,391,789 all of which are herein fully incorporated by reference. Also, such catalyst components and systems are discussed in the disclosures of EP-A-0 591 756; EP-A-0 520 732; EP-A-0 578,838; EP-A-0 638,595; EP-A-0 420 436; WO 91/04257; WO 92/00333; WO 93/08221; WO 93/08199; WO 94/01471; WO 94/07928; WO 94/03506 and WO 95/07140, all of which are herein fully incorporated by reference. Further, the employment of metallocene type catalyst for production of cyclic olefin copolymers are described by U.S. Pat. Nos. 5,241,025; 5,324,801; 5,502,124; 5,629,398 and 5,635,573, all of which are fully incorporated by reference.

In contrast to catalyst systems therebefore known for alpha-olefin polymerization that utilize a transitional metal component not having an organo ligand having a cyclopentadienyl anion moiety, now commonly referred to as conventional or traditional Ziegler-Natta (ZN) catalysts, metallocene catalysts are essentially single sited catalysts whereas ZN catalysts are almost invariably multi-sited catalysts that produce a polymer resin having a great diversity of polymeric structures.

Traditional Ziegler-Natta catalysts typically in the art comprise a transition metal halide, such as titanium or vanadium halide, and an organometallic compound of a metal of Group 1, 2 or 3, typically trialkylaluminum compounds, which serve as an activator for the transition metal halide. Some Ziegler-Natta catalyst systems incorporate an internal electron donor which is complexed to the alkyl aluminum or the transition metal. The transition metal halide may be supported on a magnesium compounds or complexed thereto. This active Ziegler-Natta catalyst may also be impregnated onto an inorganic support such as silica or alumina. For the purposes of this patent specification chromium catalysts, for example, described in U.S. Pat. No. 4,460,755, which is incorporated herein by reference, are also considered to be traditional Ziegler-Natta catalysts. For more details on traditional Ziegler-Natta catalysts, see for example, U.S. Pat. Nos. 3,687,920, 4,086,408, 4,376,191, 5,019,633, 4,482,687, 4,101,445, 4,560,671, 4,719,193, 4,755,495 and 5,070,055 all of which are herein incorporated by reference.

By contrast, an ethylene copolymer produced by a metallocene catalyst is much more uniform with respect to the polymeric structures that comprise the resulting m-LLDPE polymer resin, particularly with respect to the disparity between the differing molecular weight fractions thereof—as indicated by the $M_w/M_n$ value, molecular weight distribution, or of the m-LLDPE polymer resins $M_w/M_n$ value generally being ≦3.0—and with respect to the distribution of alpha-olefin comonomer between the different molecular weight fraction thereof—as indicated by a high comonomer distribution breadth index (CDBI) value of greater than 50% and generally much higher.

E/NB polymers produced from a homogeneous catalyst system having a single metallocene component have a very narrow distribution of the norbornene comonomer—most of the polymer molecules, regardless of their particular molecular weight, will have roughly the same or comparable NB comonomer content—that is, the CDBI of such E/NB copolymer is generally>60%. However, for purposes of this invention it is desired to produce the E/NB and E/NB/O type LLDPE to have a broad composition distribution of the NB comonomer such that the CDBI of the resulting resin is less than 60%, preferably less than 50%, and most preferably less than 45% and on the order of from about 15 to about 40%; all while the E/NB and E/NB/O type LLDPE retains a relatively narrow MWD ($M_w/M_n$) of less than 5, preferably less than 4, more preferably on the order of from about 2.3 to about 3.4. To this end, it has been found necessary to the metallocene catalyst system in a heterogeneous or supported form and to employ it in a two-phase polymerization procedure such as a slurry or gas phase polymerization procedure.

A measure of composition distribution is the "Composition Distribution Breadth Index" ("CDBI") as defined in U.S. Pat. No. 5,382,630 which is hereby incorporated by reference. CDBI is defined as the weight percent of the copolymer molecules having a comonomer content within 50% of the median total molar comonomer content. The CDBI of a copolymer is readily determined utilizing well known techniques for isolating individual weight fractions of a sample of the copolymer. One such technique is Temperature Rising Elution Fraction (TREF), as described in Wild, et al., *J. Poly. Sci. Poly. Phys. Ed.*, vol. 20, p. 441 (1982) and U.S. Pat. No. 5,008,204, which are incorporated herein by reference.

Further details of determining the CDBI of a copolymer are known to those skilled in the art. See, for example, PCT Patent Application WO 93/03093, published Feb. 18, 1993. With norbornene as such as the comonomer, the m-E/NB type LLDPE polymers employed in the films of this invention preferably have CDBI's equal to or less than 35% and in the range of 15–30%; usually in the range of 15–25% and most typically in the range of 20–25%. Wherein the norbornene comonomer is an alkyl substituted norbornene, the m-E/NB-R type LLDPE polymers employed in the films of this invention preferably have a CDBI on the order of 30 to 55%. The E/NB/O terpolymers employed in films of this invention preferably have CDBIs of less than 50%.

E/NB Copolymer Type LLDPE Resins

The m-E/NB type LLDPE that are preferred resins, have a melt index (MI) in the range of from about 0.4 to about 100, preferably in the range of from about 0.5 to 50, and more preferably from 0.8 to 4.0 dg/min as determined according to the ASTM Test Method D 1238, Condition 190/2.16. The MI range for the E/NB type LLDPE resin for film production via a blown bubble technique is preferably from about 0.8 to about 3.0 dg/min.; for cast film production the MI range of the E/NB type LLDPE resins is preferably from about 0.75 to 4.0 dg/min.; preferably 1 to 5.0 dg/min.; more preferably 1 to 4 dg/min as determined according to the ASTM Test Method D 1238, Condition 190/2.16. Choice of melt index for the E/NB type LLDPE resin will generally be driven by the type of extrusion process and the specific equipment in use as well as the end use for films and/or subsequent use in converting operations.

The ethylene/norbornene copolymer which is suitable for purposes of this invention may be prepared by copolymerizing ethylene and norbornene or an alkyl substituted norbornene in the presence of a catalyst system comprising an activated cyclopentadienyl transition metal compound; namely a metallocene catalyst system which is in a heterogeneous or supported form. The ethylene/norbornene copolymer is substantially uniform with respect to its molecular weight distribution (MWD) and norbornene or alkyl substituted norbornene is incorporated to an extent of from about 0.1 to about 10 mole %. Preferably, the ethylene/norbornene copolymer has a weight average molecular weight ($M_w$) from about 20,000 to about 300,000 and more preferably from about 60,000 to about 300,000 and a molecular weight distribution ($M_w/M_n$) substantially less than about 5, more preferably from about 2.0 to about 4.0. The ethylene/norbornene copolymer is crystalline as reflected by the presence of a well-defined melting point peak ($T_m$) by differential scanning calorimetry (DSC).

Norbornene or an alkyl substituted norbornene can generally comprise from about 0.1 to about 10 mole % of the E/NB copolymer, but preferably comprises from about 1 to about 7 mole %. At lower incorporation rates than about 0.1 mole %, the norbornene does not substantially affect the properties of the ethylene based copolymer. Conversely, at higher incorporation levels than about 10 mole %, the E/NB copolymer would become too amphorous, or in the extreme behave too much like an elastomeric polyolefin. Thus, the proportion of norbornene or alkyl substituted norbornene is essential to obtain an E/NB copolymer having the properties requisite for use in forming films of the resins of this invention. The norbornene monomer may contain other forms of norbornene as are common to its routine production and storage.

The E/NB copolymers preferred for use in the present invention have a number of properties which make them desirable. The E/NB copolymers generally have good toughness and optical clarity like homopolymers of ethylene, propylene and higher alpha-olefins; but also tend to have greater elasticity and recovery after elongation. However, films of the preferred E/NB copolymers also have toughness and excellent tear properties.

E/NB/O Terpolymer Type LLDPE Resins

A terpolymer of ethylene, norbornene (including alkyl substituted norbornenes) and a $C_3$–$C_8$ alpha-olefin is produced by a similar procedure to that for the E/NB copolymer type of LLDPE resin. That is, a metallocene catalyst in heterogeneous supported form is employed in a two-phase polymerization procedure such as a slurry or gas phase polymerization procedure for production of the E/NB/O terpolymer. Again, this procedure produces a terpolymer of relatively narrow molecular weight distribution ($M_w/M_n$), generally less than 5.0, and preferably less than 4.0, while randomly distributing the NB or NB-R monomer among the different molecular weight fractions that comprise the resulting resin.

The ethylene/norbornene/alpha-olefin terpolymers (E/NB/O) which are suitable for purposes of this invention have, on a mole % basis, a total of norbornene and alpha-olefin comonomer content of 10 mole % or less, a weight average molecular weight ($M_w$) of 20,000 to about 300,000, and preferably a combination of comonomer proportions and total comonomer content as to provide for a density of greater than 0.90 but less than about 0.955 g/cm$^3$. The E/NB/O terpolymer will have a distribution of its NB or NB-R and O comonomers throughout the molecular weight fractions of the resin such that the CDBI of this terpolymer will be less than 60% and typically will be no greater than 55% and preferably on the order of 50 to 20%. The alpha-olefins that can be employed are any of the $C_3$–$C_{20}$ alpha-olefins which heretofore have been utilized for production of conventional LLDPE resins. The preferred alpha-olefins are the $C_3$–$C_8$ olefins, such as propylene, butene-1, hexene-1, 4-methyl-1-pentene and octene-1. A preferred combination and content of comonomers is that of norbornene and hexene-1 wherein norbornene is incorporated within the E/NB/O terpolymer resin to the extent of from about 0.1 to about 10 mole %, preferably from about 1.5 to about 5.0 mole % and hexene-1 is incorporated to an extent of at least about 1 mole % up to the balance of a total comonomer content of 10 mole %. Preferably hexene-1 is incorporated in an amount of from about 1.0 to about 5.0 mole % of the E/NB/O terpolymer.

The E/NB/O terpolymer types of LLDPEs that are preferred resins have an MI of from about 0.5 to about 100, preferably from 0.8 to 50; wherein for film production by a blown bubble technique an MI of 0.8 to 3.0 dg/min as determined according to the ASTM Test Method D 1238, Condition 190/2.16 is preferred whereas for cast film production an MI of 0.75 to 4.0 dg/min is preferred; for molding applications, the above terpolymer with MI>3 dg/min are preferred.

Polymerization Methodoloy for Resin Production

The polymerization methodology employed to produce an E/NB copolymer or E/NB/O terpolymer as is used in this invention may be practiced in the manner and with metallocene catalysts as referred to, disclosed, and described in the following references U.S. Pat. Nos. 5,055,438; 5,057,475; 5,096,867; 5,017,714; 5,153,157; 5,198,401; 5,278,119; 5,324,801; 5,629,398; 5,635,573 or European Published Application Nos. 129.368; 277,004; all of which are hereby incorporated herein by reference.

Generally, the preferred catalyst systems employed in preparing the E/NB and E/NB/O resins as used in this invention can comprise a complex formed upon admixture of a Group 4 transition metal metallocene component with an activating component. The catalyst system can be prepared by addition of the requisite transition metal and alumoxane components, or a previously cationically activated transition metal metallocene component, to an inert solvent in which olefin polymerization can be carried out by a slurry or bulk phase polymerization procedure or by which the catalyst can be continuously supplied to a gas phase polymerization procedure.

The metallocene catalyst utilized in this invention is deposited on support materials known in the art, for example, any porous support material such as inorganic chlorides and inorganic oxides, such as silica, alumina, magnesia, magnesium chloride or any polymeric material, such as polyethylene and polystyrene divinyl benzene.

A particularly preferred catalyst for preparation of the E/NB copolymer and/or E/NB/O terpolymers hereof is a methyalumoxane (MAO) activated bis (1,3 butyl methyl cyclopentadienyl) zirconium dichloride as supported on silica. Such a catalyst may readily be prepared by techniques now well known to those skilled in the art For example, such a catalyst may be prepared by adding the desired amount of MAO as a 30 wt. % solution in toluene to a clear and dry reactor mantelled under a small nitrogen pressure. Additional toluene may be added, as desired and thereafter the requisite amount of metallocene in solution in toluene is added and the ingredient held under stirring at an elevated temperature, 80° C. for example, for a time up to one hour. Thereafter, this metallocene—MAO solution may be added to silica under stirring until all of metallocene—MAO solution has been added and stirring with the silica continued for a time. Thereafter, the solids may be separated from the solution and subjected to vacuum drying at an elevated temperature until a free flowing powder results, this being the supported metallocene—MAO catalyst.

Optimum results are generally obtained wherein the Group 4 transition metal compound is present in the polymerization diluent, in a concentration of preferably from about 0.00001 to about 10.0 millimoles/liter of diluent and the activating component when an ionic one is present in an amount to provide a molar activating component to transition metal ratio of from about 0.5:1 to about 2:1 or more, and in the case of an alumoxane activating component, the molar alumoxane to transition metal ratio can be high as 20.000:1 (as an Al to transition metal atom ratio). Sufficient diluent is normally used so as to provide adequate heat transfer away from the catalyst components during reaction and to permit good mixing.

The catalyst ingredients, that is, the transition metal, the alumoxane and/or ionic activators, and polymerization diluent can be added to the reaction vessel rapidly or slowly. The temperature maintained during the contact of the catalyst components can widely, such as, for example, from −100° C. to 300° C. Preferably, during formation of the catalyst, the reaction is maintained within a temperature of from about 25° C. to 100° C., most preferably about 25° C. to about 70° C. As before noted, this catalyst is placed upon a support to yield the final catalyst system.

In a preferred procedure for producing the E/NB copolymer, the catalyst system is utilized in the liquid phase (slurry, suspension or bulk phase or combination thereof), high pressure fluid phase, or gas phase. The liquid phase process comprises the steps of contacting ethylene and norbornene with the heterogeneous metallocene catalyst system in a suitable polymerization diluent and reacting said monomers in the presence of said catalyst system for a time and at a temperature sufficient to produce an E/NB copolymer of sufficient molecular weight. Conditions possible for the copolymerization of ethylene are those wherein ethylene is submitted to the reaction zone at pressures of from about 0.019 psi to about 50,000 psi and the reaction temperature is maintained at from about −100° C. to about 300° C. The reaction time may range from about 10 seconds to about 6 hours. However, it is preferred to conduct the polymerization at a temperature of at least 40° C., and more preferable at a temperature of from about 50 to about 120°C. for a time of 30 to about 60 minutes under monomer conditions that provide for incorporation of from about 0.1 to about 10 mole % of norbornene or alkyl substituted norbornene within the copolymer product.

A similar slurry procedure may be employed for production of an E/NB/O terpolymer resin, however for an E/NB/O terpolymer an appropriate quantity of a $C_3$–$C_{20}$ alpha-olefin would be added to the monomer feed and the monomer conditions are preferably those that provide for an incorporation of from about 0.1 to about 10 mole % norbornene or alkyl substituted norbornene and from about 0.1 to 10 mole % alphaolefin within the terpolymer product.

One procedure for polymerization for production of an E/NB copolymer is as follows: in a stirred-tank reactor a liquid solution of 2-norbornene (a/k/a norbornene-2) is introduced. The heterogenous-supported catalyst system is introduced via nozzles the reaction medium which is either a vapor or liquid phase. Feed ethylene gas is introduced either into the vapor phase of the reactor, or sparged into the liquid phase as is well known in the art. The reactor contains a liquid phase, such as a hexane diluent, the liquid phase is composed substantially of 2-norbornene together with such ethylene gas as dissolves in the liquid phase, and a vapor phase containing vapors of all monomers. The reactor temperature and pressure may be controlled via reflux of vaporizing comonomer (autorefrigeration), as well as by cooling coils, jackets etc. The polymerization rate is generally controlled by the polymerization conditions, specially by control of the concentration of catalyst. The ethylene and norbornene contents of the polymer product are determined by the ratio of ethylene to norbornene and their reactivity ratios in the reactor, which are controlled by manipulating the relative feed rates of these components to the reactor.

Similarly an E/NB/O terpolymer may be produced, in which case the $C_3$–$C_{20}$ alpha-olefin may be added to the solution of 2-norbornene in the stirred-tank reactor prior to introduction of the ethylene monomer feed.

Resin Additives and Processing

Conventional additives, such as antioxidants, Irganox 1076 (a hindered amine) or Weston 390 (phosphites), and the like can be incorporated with the resin in their typical quantities as desired.

With respect to the tear resistance properties of a film formed of the E/NB type LLDPE resin of this invention, wherein the E/NB copolymer resin is produced with norbornene as the comonomer at reaction temperatures of about 40–90° C. in a reaction time of from about 15–60 minutes to incorporate from about 0.1 to about 10 mole % NB; the resistance of notched tensile tear strength (NTTS) and the Elmendorf tear strength of a film made of such resin both increase compared to a LLDPE resin composed of ethylene and 10 wt. % hexene of density 0.917 g/cm$^3$. MWD of 2.13, MI of 1.0 and $T_m$ of 120° C. For E/NB copolymers wherein the norbornene comonomer is an alkyl substituted norbornene (5-alkyl norbornene-2) the alkyl of which is methyl, ethyl or the NTTS of films thereof exhibited substantial improvement compared to the same LLDPE (10 wt. % hexene) resin. For an E/NB/O terpolymer type of LLDPE resin the NTTS of a film is improved and the Elmendorf Tear Strength is also substantially improved wherein the terpolymer is produced at a reaction temperature of 80 to 90° C. in a reaction time of 15–60 minutes to incorporate at least 0.3 mole % of NB and at least 0.3 mole % alpha-olefin.

Blown films produced with an annular die and air cooling and cast films using a slot die and a chill-roll for cooling are both acceptable techniques for making a film layer of the E/NB copolymer or E/NB/O terpolymer type LLDPE resin according to the present invention. Additionally, various additives including pigments, tackifiers, antistatic agents, anti-fogging agents, antioxidants or other additives are also contemplated and may be included in the resins and/or films made therefrom.

Multilayered structures may be preferred in some applications. Such structures include, but are not limited to, coextruded films, and laminated films. Laminated films can include not only one or more film layers based on resins of the present invention, but other film layers as well, including but not limited to, polyester, polyamide, polypropylene, other polyethylenes, Sarant®, ethylene vinyl alcohol, and the like. Methods of lamination include extrusion lamination, adhesive lamination, heat lamination, and the like.

Certain polymer compositions according to the invention will be particularly suitable for molding applications, eg., injection and roto molding. Preferred compositions contain about 0.1–2.0 mol. % cyclic olefin (and exhibit melt indexes (MI>3.0).

EXAMPLES

Example 1

Ethylene/Norbornene Copolymerization

Catalyst Activation

The metallocene catalyst was prepared from 600° C. silica having a water content of 1.3 weight percent (Davison 948 silica, available from W. R. Grace, Davison Chemical Division, Baltimore, Md.). This catalyst was prepared by mixing 850 pounds (386 kg) of silica with 340 pounds (154 kg) of a catalyst precursor. The catalyst precursor was separately prepared by mixing together 82 pounds (37 kg) of a 28 weight percent solution of bis(1-methyl-3-n-butyl-cyclopentadienyl) zirconium dichloride in toluene with 1060 pounds (481 kg) of a 30 percent by weight solution of methylalumoxane available from Albermarle Corporation (Baton Rouge, La.). An additional 1300 pounds (590 kg) of toluene were added and the mixture held at 80° F. (27° C.) for 1 hour after which 6 pounds (3 kg) of a surface modifier (Kemamine AS-990 available from Witco Chemical Corporation, Houston, Tex.) was added and allowed to mix for one hour. Vacuum was applied and the catalyst was allowed to dry for fifteen hours. It was then dried at 175° F. (79° C.) to a free flowing powder. The final catalyst weight was 1216 pounds (552 kg). The final catalyst had a zirconium loading of 0.40% and aluminum loading of 12.5%

Reactor Conditions

Hexane was transferred to a clean and dry 2L, batch, autoclave reactor that was pre-baked at 150° C. under $N_2$. The reactor was scavenged with 50.8 wt. % solution of tri ethyl aluminum (TEAL) in hexane. An 80.7 wt. % norbornene solution in hexane was transferred to the reactor. Finally, ethylene was introduced under regulated pressure. The mixture was stirred until the solution was saturated with ethylene and equilibrated at the temperature selected for reaction. The preactivated catalyst powder was pressured into the reactor. Temperature was controlled at the set reaction temperature by circulating ambient temperature cooling water through the reactor jacket as needed. Ethylene was replenished as needed to maintain a predetermined pressure and the reaction was monitored by ethylene uptake. The reaction was quenched after a selected time.

Table 1 below reports the conditions of each run in terms of the quantities of NB and ethylene employed, reaction temperature and run time, polymer yield and polymer properties.

TABLE 1

| Run No. | Teal (ml) | NB (ml) | Ethylene (psi) | Rxn Temp. (° C.) | Run Time (min) | Yield (g) | NB (mole %) | $M_w$ (× 10$^3$) | $M_n$ (× 10$^3$) | $M_w/M_n$ | Tm DSC (° C.) | MI (dg/min) | CDBI (%) | Density g/cm$^3$ |
|---|---|---|---|---|---|---|---|---|---|---|---|---|---|---|
| B1 | 1 | 30 | 50 | 90 | 60 | 13 | 6.9 | 73.7 | 22.5 | 3.3 | — | 1.4 | — | — |
| B2 | 7 | 150 | 50 | 90 | 45 | 260 | 2.4 | 104.9 | 44.8 | 2.3 | 121 | 0.92 | — | 0.944 |
| B3 | 1 | 15 | 100 | 90 | 30 | 75 | 2.1 | 92.9 | 37 | 2.5 | — | 1.22 | — | — |
| B4 | 0.5 | 50 | 50 | 60 | 30 | 27 | 5.9 | 182.7 | 69.2 | 2.64 | 122 | 0.41 | 21.8 | 0.9533 |
| B5 | 0.5 | 50 | 100 | 60 | 60 | 110 | 3.5 | 253.2 | 102.4 | 2.47 | 126 | 0.85 | — | 0.9515 |
| B6 | 0.5 | 50 | 100 | 80 | 60 | 27 | 6.4 | 153 | 34.3 | 4.46 | 122 | 0.46 | — | 0.9621 |
| B7 | 1 | 25 | 50 | 60 | 60 | 60 | 3.8 | 188.1 | 60.5 | 3.11 | 121 | 0.13 | 20.9 | 0.9439 |
| B8 | 0.5 | 25 | 50 | 80 | 60 | 15 | 8 | 96.6 | 24.2 | 3.99 | 123 | 1.30 | 24.3 | 0.9671 |
| B9 | 1 | 50 | 100 | 60 | 30 | 68 | 2.1 | 216.9 | 75.2 | 2.88 | 123 | 0.61 | 43.2 | 0.9338 |
| B10 | 0.5 | 25 | 50 | 60 | 60 | 65 | 3.9 | 186.3 | 47.9 | 3.9 | 122 | 0.13 | 20.9 | 0.9339 |
| B11 | 0.5 | 15 | 100 | 80 | 30 | 60 | 4.05 | 33 | 99 | 3 | 124 | 0.55 | 21.0 | 0.9339 |
| ECD-103 | — | — | — | — | — | — | — | 37.6 | 89.1 | 2.4 | 118 | 1.05 | 58. | 0.917 |

Example 2
E/NB Copolymer Film Production and Properties

In the following example a series of thin films (3–5 mil thickness) were prepared by molding under compression of 200 psi at 180° C. and various properties of the resulting films were determined. The polymer resins employed in the production of these films were: (A) ECD-103 (now named as Exceed 350D60) which is a LLDPE of ethylene hexene copolymer containing 10 weight percent hexene; this ECD-103 is a LLDPE having a density of 0.917 g/cm$^3$, a melt index (MI) of 1.05 dg/min., a molecular weight distribution ($M_w/M_n$) of about 2.13 and a first melting point temperature of 120° C. and second temperature of 110° C. (by DSC analysis)—Film A: (B) an E/NB or ethylene-norbornene copolymer prepared with a metallocene catalyst in heterogeneous supported form by slurry polymerization, as per each E/NB run reported in Table 1 above as Film B1 to B11. Antioxidant Irganox 1076 in an amount of 0.5 gram (1 wt %) was added to all resins.

All thin film samples were tested for Notched Tensile Tear Strength (NTTS—units; energy/thickness given in lbs.), Elmendorf Tear Strength (g/mil) and were analyzed by DSC for melting point peaks. The results are given in Table 2 below.

Tear Strength

Two methods of assessing the tear strength of films were used: the Elmendorf Tear Test and the "Notched Strip Tear Test". The traditional method is the Elmendorf test, but this was found to be deficient for testing high tear strength films and compression molded samples, so a second method, dubbed the "Notched Tensile Tear Strength" (or NTTS) was developed. The sample configurations used for the tear tests are shown in FIG. 1 with A being for Elmendorf and B being for NTTS. In blown or cast films the initial notch in the sample is made parallel with either the machine or transverse direction. By convention the testing direction is defined as the axis with which the notch is aligned. At the start of the Elmendorf test one sample tab is gripped in a fixed jaw while the other is gripped in a movable jaw attached to a pendulum. When the pendulum is released it swings down, taking the movable grip with it, subjecting the sample to a complex "trouser leg" tear absorbing energy as it does so. The Elmendorf tear strength is reported as the force required to rupture the sample in g/mil. In the NTTS or notched strip test, a 0.5" wide strip has a 0.25" "notch" cut in it with a razor blade, perpendicular to its long axis, which may be parallel or perpendicular to the machine direction. The sample is gripped by jaws set 1.5" apart and subjected to tensile deformation in an Instron tensile testing machine at an elongation rate of 0.5"/min. The tear strength (lbs) is reported as the energy (lb-in) required to rupture the sample divided by its thickness (in). The notched strip tear test (NTTS) has the added advantage that the deformation zone can be directly observed during the course of the test.

TABLE 2

| Film Resin Composition (wt %) | A | B1 | B2 | B3 | B4 | B5 | B6 | B7 | B8 | B9 | B10 | B11 |
|---|---|---|---|---|---|---|---|---|---|---|---|---|
| LLDPE (ECD-103) | 100 | — | — | — | — | — | — | — | — | — | — | — |
| E/NB | — | 100 | 100 | 100 | 100 | 100 | 100 | 100 | 100 | 100 | 100 | 100 |
| FILM | | | | | | | | | | | | |
| NTTS (lbs.) | 183 | 297 | 270 | 265 | 262 | 248 | 246 | 245 | 232 | 192 | 210 | 211 |
| Elmendorf Tear Strength (g/mil) | 361 | — | 329 | — | 611 | 203 | — | 370 | — | 336 | — | 630 |
| Melting point Peaks (DSC) ° C. | 120, 110 | — | 121, 101 | — | 122, 110 | 126, 110 | 122, 110 | 121, 111 | 123, 111 | 123, 111, 74 | 122, 111 | 124, 106 |
| Mole % Monomers in Film Resin | | | | | | | | | | | | |
| Ethylene | 96.3 | 93.1 | 97.6 | 97.9 | 94.1 | 96.5 | 93.6 | 96.2 | 92.0 | 97.9 | 96.1 | 95.95 |
| Hexene | 3.7 | — | — | — | — | — | — | — | — | — | — | — |
| Norbornene | — | 6.9 | 2.4 | 2.1 | 5.9 | 3.5 | 6.4 | 3.8 | 8.0 | 2.1 | 3.9 | 4.05 |
| Wt. % Monomers In Film Resin | | | | | | | | | | | | |
| Ethylene | 89.7 | 80.1 | 92.3 | 93.2 | 82.5 | 89.2 | 81.5 | 88.2 | 77.4 | 93.3 | 88.1 | 87.59 |
| Hexene | 10.3 | — | — | — | — | — | — | — | — | — | — | — |
| Norbornene | — | 19.9 | 7.7 | 6.8 | 17.5 | 10.8 | 18.5 | 11.8 | 22.6 | 6.7 | 11.9 | 12.41 |
| Film Resin | | | | | | | | | | | | |
| Density (g/cc) | 0.917 | — | 0.944 | — | 0.9533 | 0.9515 | 0.9621 | 0.9439 | 0.9671 | 0.9338 | 0.9339 | 0.9339 |
| CDBI (%) | 58 | — | — | — | 21.8 | — | — | 20.9 | 24.3 | 43.2 | 20.9 | 21.0 |
| Metl Index (dg/min) | 1.05 | 1.4 | 0.92 | 1.22 | 0.41 | 0.85 | 0.46 | 0.13 | 1.30 | 0.61 | 0.13 | 0.55 |

Example 3
Ethylene/5-Alkyl Norbornene-2 Copolymer Production

Catalyst-Activation

An activated catalyst was prepared as in Example 1 and used for three polymerization runs as reported in Table 3 below as "EX-370."

A second activated catalyst was prepared as in Example 1 with the same molar quantities of catalyst components except that the transition metal compound used for catalyst production was dimethylsilylbis (indenyl) zirconium dichloride. This catalyst was used for three polymerization runs as reported in Table 3 below as "Zr-SS."

Reactor Conditions

Copolymerization was carried out as in Example 1, except that instead of norbornene-2, 5-methyl norbornene-2, or 5-ethylnorbornene-2 or 5-hexylnorbornene-2 was used as comonomer in quantities and under conditions as reported in Table 3 below.

TABLE 3

| Run No. | Catalyst | NB-R (ml) [R] | Ethylene (psi) | Rxn Temp. (° C.) | Run Time (min) | Yield (g) | NB-R (mole %) | $M_w$ (× 10³) | $M_n$ (× 10³) | $M_w/M_n$ | Tm DSC (° C.) | MI (dg/min) | CDBI (%) | Density g/cm³ |
|---|---|---|---|---|---|---|---|---|---|---|---|---|---|---|
| B12 | EX-370 | 12 [CH₃] | 100 | 90 | 30 | 60 | 1.6 | 69 | 32 | 2.15 | 125/112 | 0.2158 | 48 | 0.945 |
| B13 | Zr-SS | 12 [CH₃] | 100 | 90 | 30 | 116 | 3.6 | 131 | 53 | 2.44 | 126/110 | 2.857 | 38 | 0.951 |
| B14 | EX-370 | 12 [CH₃CH₂] | 100 | 90 | 40 | 68 | 1.1 | 113 | 49 | 2.3 | 127/112 | 0.1793 | 54 | 0.941 |
| B15 | Zr-SS | 12 [CH₃CH₂] | 100 | 90 | 30 | 60 | 1.6 | 88 | 28 | 3.11 | 127/111 | 2.825 | 43 | 0.946 |
| B16 | EX-370 | 12 [hexyl] | 100 | 90 | 30 | 84 | 0.4 | 101 | 49 | 2.1 | 130/114 | 0.505 | 40 | 0.942 |
| B17 | Zr-SS | 12 [hexyl] | 100 | 90 | 30 | 54 | 1.6 | 51 | 18 | 2.9 | 126/113 | 3.493 | 32 | 0.947 |

Example 4
E/NB-R Copolymer Film Production and Properties

Films of the E/NB-R copolymer resins as reported in Table 3 above as runs B12 to B17 were prepared into films in a manner similar to Example 2 and tested in a like manner. Table 4 below reports on the properties of the E/NB-R copolymer films.

TABLE 4

| | FILM SAMPLE | | | | | | |
|---|---|---|---|---|---|---|---|
| Film Resin Composition (wt %) | A | B12 | B13 | B14 | B15 | B16 | B17 |
| LLDPE (ECD-103) | 100 | — | — | — | — | — | — |
| E/NB-R | — | 100 | 100 | 100 | 100 | 100 | 100 |
| FILM NTTS (lbs.) | 183 | 304 | 303 | 318 | 310 | 448 | 262 |
| Melting point Peaks (DSC) ° C. | 120, 110 | 125 112 | 126 110 | 127 112 | 127 111 | 130 114 | 126 113 |
| Mole % Monomers in Film Resin | | | | | | | |
| Ethylene | 96.3 | 98.4 | 96.4 | 98.9 | 97.3 | 99.6 | 98.4 |
| Hexene | 3.7 | — | — | — | — | — | — |
| Norbornene-R | — | 1.6 | 3.6 | 1.1 | 1.6 | 0.4 | 1.6 |
| Wt. % Monomers In Film Resin | | | | | | | |
| Ethylene | 89.7 | 94.1 | 87.4 | 95.4 | 89.2 | 97.5 | 90.6 |
| Hexene | 10.3 | — | — | — | — | — | — |
| Norbornene-R | — | 5.9 | 12.6 | 4.6 | 10.8 | 2.5 | 9.4 |
| Film Resin | | | | | | | |
| Density (g/cm³) | 0.917 | 0.945 | 0.951 | 0.941 | 0.946 | 0.942 | 0.947 |
| CDBI (%) | 58 | 48 | 38 | 54 | 43 | 40 | 32 |
| Melt Index (dg/min) | 1.05 | 0.2158 | 2.857 | 0.1793 | 2.825 | 0.505 | 3.493 |

Example 5
Ethylene/Norbornene/Hexene Terpolymer Production

Catalyst Activation
An activated catalyst was prepared as in Example 1.
Reactor Conditions
Reaction was carried out as in Example 1 except that a quantity of hexene-1 was also added to the norbornene solution in the reactor prior to introduction of ethylene.
Table 5 below reports the condition of each run.

Example 6
E/NB/O Terpolymer Film Production and Properties

Films of the E/NB/O terpolymer resins as reported in Table 5 above as runs B18 and B19 were prepared into films in a manner similar to Example 2 and tested in a like manner. Table 6 below reports on the properties of the E/NB/O terpolymer films.

TABLE 5

| | Teal (ml) | NB (ml) | Hexene (ml) | Ethylene (psi) | Rxn Temp. (° C.) | Run Time (min) | Yield (g) | NB (mole %) | Hexene (mole %) | $M_w$ (× 10³) | $M_n$ (× 10³) | MWD | Tm ° C. | MI (dg/min) |
|---|---|---|---|---|---|---|---|---|---|---|---|---|---|---|
| B18 | 0.5 | 10 | 15 | 100 | 90 | 30 | 68 | 2.2 | 1.2 | 93.5 | 33.7 | 2.8 | 113 | 1.7 |
| B19 | 0.5 | 10 | 15 | 100 | 70 | 30 | 47 | 1.8 | 0.90 | 131.1 | 62.1 | 2.1 | 116 | 0.4 |
| B20 | 0.5 | 15 | 30 | 100 | 80 | 30 | 50 | 4.0 | 3.00 | 58.4 | 20.9 | 2.8 | — | 6.9 |

TABLE 6

| Film Resin Composition (wt %) | FILM SAMPLE | | |
|---|---|---|---|
| | A | B18 | B19 |
| LLDPE (ECD-103) | 100 | — | — |
| E/NB/O | — | 100 | 100 |
| FILM | | | |
| NTTS (lbs.) | 183 | 223 | 199 |
| Elmendorf Tear Strength (g/mil) | 361 | 516 | 400 |
| Melting point Peaks (DSC) ° C. | 120, 110 | 113, 101 | 116, 101 |
| Mole % Monomers in Film Resin | | | |
| Ethylene | 96.3 | 96.6 | 97.3 |
| Hexene | 3.7 | 1.2 | 0.9 |
| Norbornene | — | 2.2 | 1.8 |
| Wt. % Monomers In Film Resin | | | |
| Ethylene | 89.7 | 89.8 | 91.8 |
| Hexene | 10.3 | 3.3 | 2.5 |
| Norbornene | — | 6.9 | 5.7 |
| Film Resin | | | |
| Density | 0.917 | 0.933 | 0.935 |

Example 7

Ethylene/Norbornene/Hexene Terpolymer Production

Catalyst Activation

An activated catalyst was prepared as in Example 1.

Reactor Conditions

In this example a gas phase polymerization reaction was utilized. A continuously run, fluidized bed, gas phase reactor [internal diameter of 16.25 in (41.27 cm)] was utilized with the activated, supported catalyst prepared as described. In this procedure, norbornene was dissolved in the hexene comonomer and this solution was supplied to the low pressure gas phase reactor in the quantities and under the conditions as indicated below in Table 7 until a steady state was achieved. Injection of the norbornene/hexene solution into the reactor served to vaproize the solution. At steady state for all runs, the reaction temperature was maintained at 75–80° C. and reaction pressure was maintained at 300 psi. The polymer properties reported in Table 7 below are for those polymer composition recovered after steady state operation was achieved.

TABLE 7

| | B-21 | B-22 | B-23 | B-24 | B-25 |
|---|---|---|---|---|---|
| Norbornene wt. % in hexene (comonomer solution) | 10 | 20 | 40 | 80 | 80 |
| Ethylene (psi) to vaporized comonomer solution (psi) flow ratio | 0.19 | 0.28 | 0.30 | 0.30 | 0.42 |
| Hexene mole % in gas phase | 0.37 | 0.35 | 0.32 | 0.19 | 0.14 |
| Residence Time (hours) | 3 | 3.2 | 3.5 | 4.4 | 3.9 |
| Catalyst Productivity (g/g) | 1256 | 1147 | 1353 | 824 | 544 |
| Melt Index | 1.64 | 0.99 | 1.82 | 1.16 | 0.94 |
| Density (g/cm$^3$) | 0.9261 | 0.9255 | 0.9287 | 0.934 | 0.9381 |
| NB mole % (NMR) | 0.32 | 0.7 | 1.0 | 1.5 | 2.3 |
| Hexene mole % (NMR) | 1.7 | 1.7 | 1.4 | 1.1 | 0.64 |
| Mn (x1000) | 29 | 32 | 23 | 23 | 29 |
| Mw (x1000) | 76 | 93 | 73 | 75 | 86 |
| Mw/Mn | 2.62 | 2.91 | 3.26 | 3.26 | 2.96 |
| DSC Melting Point ° C. | 121–123 | 122 | 124 | 126 | 127 |
| Crystallinity % | 37.2 | 36.7 | 38 | 36.9 | 31.4 |
| CDBI | 58 | 56 | 47 | 33 | 26 |

Example 8

E/NB/O Terpolymer Film Production and Properties

Films of the E/NB/O terpolymer resins as reported in Table 7 above as runs B-21 and B-25 were prepared into films in a manner similar to Example 2 and tested in a like manner. Table 8 below reports on the properties of the E/NB/O terpolymer films

TABLE 8

E/NB/O FILM SAMPLE

| Film Resin Compositoin (wt %) | A | B21 | B22 | B23 | B24 | B25 |
|---|---|---|---|---|---|---|
| LLDPE (ECD-103) | 100 | — | — | — | — | — |
| E/NB | — | 100 | 100 | 100 | 100 | 100 |
| FILM | | | | | | |
| NTTS (lbs.) | 183 | 240 | 206 | 209 | 239 | 269 |
| Elmendorf Tear Strength (g/mil) | 369 | 370 | 467 | 460 | 483 | 483 |
| Melting point Peaks (DSC) ° C. | 120, 110 | 121–123 | 122 | 124 | 126 | 127 |
| Mole % Monomers in Film Resin | | | | | | |
| Ethylene | 96.43 | 97.98 | 97.6 | 97.6 | 97.4 | 97.06 |
| Hexene | 3.57 | 1.7 | 1.7 | 1.4 | 1.1 | 0.64 |
| Norbornene | — | 0.32 | 0.7 | 1.0 | 1.5 | 2.3 |
| Wt. % Monomers In Film Resin | | | | | | |
| Ethylene | 89.7 | 94.07 | 92.92 | 92.82 | 92.12 | 90.96 |
| Hexene | 10.3 | 4.9 | 4.85 | 3.99 | 3.12 | 1.80 |
| Norbornene | — | 1.03 | 2.23 | 3.19 | 4.76 | 7.24 |
| Film Resin Density | 0.917 | 0.9261 | 0.9255 | 0.9287 | 0.934 | 0.9381 |

Although this invention has been described by reference to its preferred embodiments, upon reading this disclosure, those of skill in the art may appreciate changes and modifications that can be made which do not depart from the scope and spirit of this invention as described above or claimed hereafter.

We claim:

1. A composition, comprising a product of polymerizing ethylene and cyclic olefin in the presence of a metallocene catalyst in heterogeneous form to yield a substantially linear ethylene copolymer having an ethylene content of or greater than 77 weight percent and a content of incorporated cyclic olefin of 0.1 to 10 mole %, a molecular weight distribution of less than 5.0, a weight average molecular weight of at least 20,000, and a CDBI of less than 60%.

2. The composition of claim 1, wherein said cyclic olefin is norbornene or an alkyl substituted norbornene.

3. The composition of claim 2, wherein said ethylene copolymer has a CDBI of or less than 30% and a peak melting point temperature ($T_m$) in the range of 120 to 135° C.

4. The composition of claim 3, wherein said cyclic olefin is norbornene and said ethylene copolymer has a content of incorporated norbornene of 1 to 7 mole %.

5. The composition of claim 2, wherein said ethylene copolymer has a MI of 0.1 to 100 dg/min as determined according to the ASTM Test Method D 1238, Condition 190/2.16.

6. The composition of claim 5, wherein said ethylene copolymer has a MWD of 2.0 to 4.0.

7. The composition of claim 2, wherein said cyclic olefin is a $C_{1-10}$ alkyl substituted norbornene.

8. The composition of claim 1, wherein said ethylene copolymer is further a product of polymerizing ethylene and cyclic olefin in the presence of a $C_3$–$C_{20}$ alphaolefin and said hetergeneous metallocene catalyst to yield a substantially linear terpolymer having a content of incorporated alpha-olefin and cyclic olefin which together total to less than 10 mole % and said ethylene terpolymer has a weight average molecular weight of at least 20,000.

9. The composition of claim 8, wherein said terpolymer has a density of or less than 0.955 g/cm³.

10. The composition of claim 7, wherein said terpolymer has a MWD of 5.0 or less.

11. The composition of claim 10, wherein said terpolymer has a content of incorporated alpha-olefin of 0.1 mole % or greater.

12. The composition of claim 10, wherein said alpha-olefin is hexene-1.

13. The composition of claim 8, wherein said cyclic olefin is norbornene or alkyl NB and said ethylene polymer has a CDBI of less than 60%.

14. A film, comprising: a film layer composed of a product of polymerizing ethylene and cyclic olefin in the presence of a metallocene catalyst in heterogeneous form to yield a substantially linear ethylene copolymer having an ethylene content of or greater than 77 weight percent and a content of incorporated cyclic olefin of 0.1 to 10 mole %, a molecular weight distribution of less than 5.0, a weight average molecular weight of at least 20,000, and a CDBI of less than 60%.

15. The film of claim 14, wherein said cyclic olefin is norbornene or an alkyl substituted norbornene.

16. The film of claim 15, wherein said ethylene copolymer has a CDBI of less than 30% and a peak melting point temperature ($T_m$) in the range of 120 to 135° C.

17. The film of claim 16, wherein said cyclic olefin is norbornene and said ethylene copolymer has a content of incorporated norbornene of 1 to 7 mole %.

18. The film of claim 17, wherein said ethylene copolymer has a MI of 0.1 to 10 dg/min as determined according to the Test Method D 1238, Condition 190/2.16.

19. The film of claim 15, wherein said cyclic olefin is a $C_{1-10}$ alkyl substituted norbornene.

20. The film of claim 14, wherein said ethylene polymer is further a product of polymerizing ethylene and cyclic olefin in the presence of a $C_3$–$C_{20}$ alpha-olefin and said heterogenous metallocene to yield a substantially linear terpolymer having a content of incorporated alpha-olefin and cyclicolefin which totals to less than 10 mole % and said terpolymer has a weight average molecular weight of at least 20,000.

21. The film of claim 20, wherein said terpolymer has a density of or less than 0.955 g/cm³.

22. The film of claim 21, wherein said terpolymer has a content of incorporated alpha-olefin of 0.1 mole % or greater.

23. A film of claim 21, wherein said cyclic olefin is norbornene, or alkyl substituted norbornene.

24. The film of claim 23, wherein said alpha-olefin is hexene-1.

25. A molded part, comprising: a molded part layer composed of a product of polymerizing ethylene and cyclic olefin in the presence of a metallocene catalyst in heterogeneous form to yield a substantially linear ethylene copolymer having an ethylene content of or greater than 77 weight percent and a content of incorporated cyclic olefin of 0.1 to 10 mole %, a molecular weight distribution of less than 5.0, a weight average molecular weight of at least 20,000, and a CDBI of less than 60%.

26. A molded part of claim 25, wherein said cyclic olefin is norbornene or an alkyl substituted norbornene.

27. The molded part of claim 26, wherein said ethylene copolymer has a CDBI of less than 30% and a peak melting point temperature ($T_m$) in the range of 120 to 135° C.

28. The molded part of claim 27, wherein said cyclic olefin is norbornene and said ethylene copolymer has a content of incorporated norbornene of 0.1 to 7 mole %.

29. The molded part of claim 28, wherein said ethylene copolymer has a MI of 0.1 to 100 dg/min., or higher as determined according to the ASTM Test Method D 1238, Condition 190/2.16.

30. The molded part of claim 26, wherein said cyclic olefin is a $C_{1-10}$ alkyl substituted norbornene.

31. The molded part of claim 25, wherein said ethylene polymer is further a product of polymerizing ethylene and cyclic olefin in the presence of a $C_3$–$C_{20}$ alpha-olefin and said heterogenous metallocene to yield a substantially linear terpolymer having a content of incorporated alpha-olefin and cyclicolefin which totals to less than 10 mole % and said terpolymer has a weight average molecular weight of at least 20,000.

32. The molded part of claim 31, wherein said terpolymer has a density of or less than 0.955 g/cm$^3$.

33. The molded part of claim 32, wherein said terpolymer has a content of incorporated alpha-olefin of 0.1 mole % or greater.

34. A molded part of claim 33, wherein said cyclic olefin is norbornene, or alkyl substituted norbornene.

35. The molded part of claim 34, wherein said alpha-olefin is hexene-1.

36. The composition of claim 1, wherein said ethylene copolymer has a melting transition as determined by DSC in the region of 60 to 135°0 C.

37. The film of claim 14, wherein said ethylene copolymer has a melting transition as determined by DSC in the region of 60 to 135° C.

38. The molded part of claim 25, wherein said ethylene copolymer has a melting transition as determined by DSC in the region of 60 to 135° C.

* * * * *